United States Patent [19]

Bartholomew et al.

[11] 4,160,654
[45] Jul. 10, 1979

[54] METHOD FOR MAKING SILVER-CONTAINING GLASSES EXHIBITING THERMOPLASTIC PROPERTIES AND PHOTOSENSITIVITY

[75] Inventors: Roger F. Bartholomew, Painted Post; Joseph F. Mach, Corning; Che-Kuang Wu, Horseheads, all of N.Y.

[73] Assignee: Corning Glass Works, Corning, N.Y.

[21] Appl. No.: 844,783

[22] Filed: Oct. 25, 1977

[51] Int. Cl.² .............. C03C 15/00; C03C 21/00
[52] U.S. Cl. ........................... 65/30 E; 65/30 R; 65/DIG. 2; 106/52; 106/74; 106/DIG. 6; 427/169
[58] Field of Search ............ 65/DIG. 2, 30 E, 30 R; 106/DIG. 6, 52, 74; 427/169

[56] References Cited

U.S. PATENT DOCUMENTS

| | | | |
|---|---|---|---|
| 2,030,476 | 2/1936 | Smith | 65/30 E |
| 2,647,068 | 7/1953 | Patai | 65/30 E |
| 2,651,145 | 9/1953 | Stookey | 65/DIG. 2 |
| 2,732,298 | 1/1956 | Stookey | 65/30 E X |
| 3,912,481 | 10/1975 | Bartholomew et al. | 106/74 X |
| 3,948,629 | 4/1976 | Bartholomew et al. | 106/74 X |
| 4,035,527 | 7/1977 | Deeg | 106/DIG. 6 |
| 4,065,283 | 12/1977 | Asahara et al. | 65/30 E |
| 4,076,542 | 2/1978 | Deeg et al. | 65/DIG. 2 |

FOREIGN PATENT DOCUMENTS

| | | | |
|---|---|---|---|
| 474472 | 12/1967 | Japan | 65/30 E |
| 4736003 | 12/1968 | Japan | 65/30 E |

OTHER PUBLICATIONS

Glass and Glass Manufacture—by Percival Marson—pp. 116 and 117.

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

This invention is concerned with the preparation of glass articles containing silver ions which exhibit thermoplastic properties and may, optionally, demonstrate photosensitivity to ultraviolet radiation. Such articles are produced through the exchange of $Ag^+$ ions for $Na^+$ and/or $K^+$ ions in a hydrated $Na_2O$ and/or $K_2O$—$SiO_2$ glass. The articles will demonstrate photosensitivity when the compositions thereof also contain halide ions.

22 Claims, No Drawings

METHOD FOR MAKING SILVER-CONTAINING GLASSES EXHIBITING THERMOPLASTIC PROPERTIES AND PHOTOSENSITIVITY

BACKGROUND OF THE INVENTION

The exposure of alkali metal silicate glass bodies to steam-containing environments at elevated temperatures to cause water to enter into the structure of the glass, thereby imparting thermoplastic behavior thereto, is known to the prior art in such literature as U.S. Pat. Nos. 3,498,802 and 3,912,481.

The former patent discloses the hydration of glass powders consisting essentially, in mole percent on the oxide basis, of 6-20% $Na_2O$ and/or $K_2O$ and 80-94% $SiO_2$, the sum of those components totalling at least 90 mole percent of the compositions. The glass powders were subjected to gaseous environments containing at least 50% by weight steam at a pressure of at least one atmosphere and at a temperature commonly between about 100°-200° C. The hydrated powders could be formed into shapes of various geometries at temperatures of about 80°-120° C.

The latter patent describes a two-step method for hydrating glass bodies in steam-containing atmospheres to yield water-containing glass structures exhibiting thermoplastic characteristics. The process comprehends an initial hydration in a saturated or near saturated steam atmosphere at elevated temperatures, i.e., between about 100° C. and the softening point of the glass, followed by a dehydration step at a lower relative humidity. The dehydration step can be so carefully conducted that the amount of water remaining in the glass structure can be rather rigorously controlled, thereby permitting close regulation of the degree of thermoplasticity imparted to the hydrated glass. Glass compositions operable in that invention consisted essentially, in mole percent on the oxide basis, of 3-25% $Na_2O$ and/or $K_2O$ and 50-95% $SiO_2$, the sum of those components constituting at least 55 mole percent of the total composition.

The hydration of alkali metal silicate glass articles in aqueous solutions is disclosed in U.S. Pat. No. 3,948,629. That patent describes contacting fine-dimensioned glass bodies, customarily having thickness dimensions not exceeding about 5 mm., with an aqueous solution having a pH less than 6 and, preferably, less than 5 at a temperature in excess of 100° C. and at a pressure of at least 20 psig. Since the solutions were acidic in nature, the patent noted an exchange taking place between $H^+$ ions of the solution and $Na^+$ and/or $K^+$ ions in the glass. Also, where the aqueous solution contained $K^+$ ions, the patent observed an exchange occurring between those $K^+$ ions and $Na^+$ ions where present in the glass. Glass compositions operable in that invention consisted essentially, in mole percent on the oxide basis, of 3-25% $Na_2O$ and/or $K_2O$ and 50-95% $SiO_2$, the sum of those constituents constituting at least 55 mole percent of the total composition.

SUMMARY OF THE INVENTION

The present invention is founded in the discovery that silver ions ($Ag^+$) can be introduced into an alkali metal silicate glass either (1) concurrently with or (2) subsequently to hydration of the glass.

In the first embodiment of the invention, the alkali metal silicate glass, in the form of bodies having thickness dimensions less than about 5 mm., is contacted with aqueous silver salt solutions having a pH no greater than 4 at temperatures of at least about 100° C. and at pressures of at least 20 psig. This practice results in the simultaneous occurrence of glass hydration and the exchange of $Ag^+$ ions for alkali metal ions in the glass. Acidification of the silver salt solution with very minor additions of acid, e.g., less than 1% by weight of a mineral acid such as $HNO_3$, will frequently yield a product of greater optical clarity and displaying less of the amber coloration characteristically exhibited by the presence of reduced silver in glass.

In the second embodiment of the invention, the alkali metal silicate glass is subjected to the steam hydration-dehydration procedure set forth in U.S. Pat. No. 3,912,481, supra, and $Ag^+$ ions are thereafter introduced into the hydrated glass by means of contacting the glass with an aqueous solution of a silver salt having a pH not exceeding about 5 at a temperature in excess of about 100° C. The exchange of $Ag^+$ ions for alkali metal ions in the glass will occur at ambient atmospheric pressure, although the use of added pressure or, conversely, a partial vacuum does not adversely affect the rate of exchange. Again, acidification of the aqueous silver salt solution appears to yield a more satisfactory final product. Normally, the ion exchange reaction will be conducted at temperatures between about 150°-250° C. However, treatments up to the critical temperature of water, i.e., 374° C., can be contemplated.

Both process embodiments can be applied equally satisfactorily with glass compositions operable in U.S. Pat. Nos. 3,912,481 and 3,948,629, supra, such glasses consisting essentially, in mole percent on the oxide basis, of about 3-25% $Na_2O$ and/or $K_2O$ and 50-95% $SiO_2$, the sum of those components constituting at least 55% of the total composition. Other constituents can be included to modify the chemical and physical properties of the hydrated glass and/or the parent anhydrous glass. As illustrative of such, $Al_2O_3$, $B_2O_3$, BaO, CaO, CdO, MgO, PbO, and ZnO can be useful in altering the melting and forming characteristics of the base glass and/or enhancing the chemical durability of both the base glass and the hydrated glass. BaO, $B_2O_3$, CaO, PbO, and ZnO can be included in amounts up to about 25%; MgO can be useful up to about 35%; and $Al_2O_3$ can be operable up to about 20%. Where other optional components are utilized, it is preferred that individual additions thereof not exceed about 10%. $Li_2O$ appears to inhibit hydration such that, if present at all, the quantity will be held below about 10%. The inclusion of CaO frequently yields a translucent or opaque hydrated body. Therefore, its use will be avoided where a transparent body is demanded. The common glass colorants such as CdS—Se, CoO, $Cr_2O_3$, $Fe_2O_3$, $MnO_2$, NiO, and $V_2O_5$ may also be included in customary amounts up to a few percent. Self-evidently, where the function of these ingredients is not restricted to coloring, individual additions up to 10% can be tolerated. Finally, conventional fining agents can be employed in usual amounts.

Although concentrated aqueous solutions of silver salts can be satisfactorily utilized, the properties exhibited by the final product are not significantly different from those obtained utilizing dilute solutions. Hence, a 10% by weight silver ion concentration seems to be a practical maximum with a preferred range being about 0.1-2% by weight. Also, as is noted hereinafter, increased $Ag^+$ ion concentration causes the glass to develop a dark amber tint.

As a matter of convenience, hydration of the base glass in either embodiment of the invention will preferably be undertaken in an autoclave, because such apparatus permits relatively easy control of the contacting temperature, pressure, and atmosphere. Also, again as a matter of convenience, the maximum hydration temperature employed will be limited to 374° C., the critical temperature of water.

The silver-containing product resulting from the concurrent hydration-silver ion exchange process embodiment of the invention frequently manifests a yellowish hue, this coloration generally becoming progressively darker as the silver ion content is increased. However, irrespective of the presence of a yellowish coloration, rapidly firing the product of that process embodiment in the ambient atmosphere results in a foamed glass body coated with metallic silver, thereby signifying the presence of both water and silver in the hydrated glass.

Hydration of these silver-containing hydrated glasses for an extended period of time in a steam atmosphere leads to the production of a shiny, non-conducting metallic surface, indicating reduction of the silver ions to elemental silver. However, immersion of the glass into a hot, dilute $HNO_3$ aqueous solution forms clear, transparent hydrated glass with increased water content.

When the halide ions selected from the group $F^-$, $Cl^-$, $Br^-$, or $I^-$ are included in the base composition, the glass will exhibit photosensitivity. Most commonly, this photosensitivity is induced upon exposure to ultraviolet radiation but, in certain instances, that behavior can be observed under ambient indoor lighting.

Various optical phenomena can be produced in these silver-containing glasses and these have been especially pronounced within a relatively narrow range of compositions, viz., glasses consisting essentially, in mole percent on the oxide basis, of about 70–82% $SiO_2$, 10–17% $Na_2O$ and/or $K_2O$, 5–15% $ZnO$ and/or $PbO$, 0.5–5% $Al_2O_3$, and 0.1–3% of a halide selected from the group $F^-$, $Cl^-$, $Br^-$, and $I^-$. In general, about 0.1–0.3% halide is preferred with $Cl^-$ being the most desirable. Very minor amounts, i.e., about 0.001–0.1 mole percent of such sensitizing agents as $CuO$ and/or $CeO_2$ may advantageously be added.

Where such glasses were hydrated in aqueous silver salt solutions and then darkened via exposure to ultraviolet radiation, optical bleaching was possible employing either polarized or non-polarized laser beams. The use of a non-polarized laser beam resulted in the darkened glass being bleached to produce an area of the glass exhibiting the same color as the irradiating laser. When a polarized laser beam was utilized, the ultraviolet darked glass was optically bleached to provide an area in the glass capable of polarizing visible light. Measurement of the light transmitted by such a bleached area demonstrated dichroic ratios of up to about 3:1. These effects appear to be permanent.

Where the glass is first hydrated and partially dehydrated in a water-containing gaseous atmosphere in accordance with U.S. Pat. No. 3,912,481, and thereafter silver ions are introduced by means of an ion exchange reaction in an aqueous solution of a silver salt, various colors can be obtained in either opal or transparent glasses depending upon variations in the halide contents of the original batch compositions and/or in the aqueous ion exchange solutions. Hence, a whole spectrum of colors can be achieved with one base glass composition.

Such hydrated-dehydrated glasses containing ion-exchanged $Ag^+$ ions can be darkened through exposure to ultraviolet radiation and can be bleached with high intensity red light such as is readily obtainable from a laser. Dichroism is observed when the red light is polarized. The area of glass darkened by exposure to ultraviolet radiation appear to be stable to the impingement of sunlight and thermal fading likewise appears to be absent.

It is believed that there is a threshold for the electric field intensity of light to bleach or polarize the darkened glass. A postulated explanation is that when the intensity of red light is sufficiently high, a surface diffusion of $Ag^+$ ions and electrons which are ejected by the red light occurs.

The highest degree of dichroism is attained when the darkening of the glass via ultraviolet radiation is carried out to the extent that no further darkening will occur before bleaching with high intensity, polarized red light. Nevertheless, the contrast of a dichroic image is not significantly affected by further darkening under ultra-violet radiation, if such occurs.

DESCRIPTION OF PREFERRED EMBODIMENTS

Table I records a group of anhydrous glass compositions operable in the instant invention expressed both in approximate mole percent and weight percent on the oxide basis as calculated from the batch. Inasmuch as it is not known with which cation(s) the halides are combined, they are simply reported as halide, in accordance with conventional glass analysis practice. The actual batch ingredients (other than the halides) can comprise any materials, either the oxides or other compounds, which, when melted together, will be converted into the desired oxide composition in the proper proportions.

The glasses set forth in Table I can be prepared in the following manner. The batch components will be thoroughly blended together, commonly in a ball mill to assist in securing a homogeneous melt, and the mixture deposited in platinum crucibles. The crucibles will be placed in a furnace operating at about 1450°–1600° C. and the batches melted for about 16 hours with stirring. (Larger melts may, of course, be prepared in pots or continuous melting units in accordance with known commercial glassmaking practice.) Thereafter, the melts will be cooled and shaped into glass articles of desired geometries. Glass ribbon about 1"×0.015" provides useful samples for test purposes.

Volatilization of halide can be quite high during melting, particularly where temperatures in the upper extreme of the melting range are employed. Thus, losses of about 25–50% by weight are common.

Arsenic and antimony were included in the glass compositions to perform their conventional function as a fining agent.

TABLE I

| | (Weight Percent) | | | | | | | |
|---|---|---|---|---|---|---|---|---|
| | 1 | 2 | 3 | 4 | 5 | 6 | 7 | 8 |
| SiO$_2$ | 72 | 42.25 | 59.23 | 70 | 75.2 | 64 | 70 | 65 |
| Na$_2$O | 17 | 3.1 | 3.5 | — | 6 | 10 | 10 | 12.5 |
| K$_2$O | — | 5.65 | 7.92 | 18.5 | 9 | — | — | — |
| Li$_2$O | — | — | — | — | — | 2 | 5 | 2 |
| B$_2$O$_3$ | — | — | — | — | — | 15 | 10 | 12.5 |
| Al$_2$O$_3$ | 2 | 2 | 2 | 2 | — | 3 | 2 | 2 |
| ZnO | 7 | — | — | 7.5 | 9 | — | — | — |
| BaO | 2 | — | — | 2 | — | 4 | 2 | 2 |
| PbO | — | 43.9 | 27.15 | — | — | — | — | — |
| As$_2$O$_3$ | — | 0.2 | 0.2 | — | — | — | — | — |
| Sb$_2$O$_3$ | — | 0.1 | 0.1 | — | — | — | — | — |

TABLE I-continued

|  | | | | | | | | |
|---|---|---|---|---|---|---|---|---|
| ZrO$_2$ | — | — | — | — | — | 2 | — | — |
| Cl | — | — | — | — | — | 1 | 1 | 2 |

|  | 9 | 10 | 11 | 12 | 13 | 14 | 15 | 16 |
|---|---|---|---|---|---|---|---|---|
| SiO$_2$ | 65 | 63 | 51 | 58 | 62 | 55 | 60 | 55 |
| Na$_2$O | 12.5 | 11 | 15 | 15 | 11 | 10 | 12 | 12 |
| Li$_2$O | 2 | — | — | — | — | — | — | — |
| B$_2$O$_3$ | 12.5 | 18 | 25 | 15 | 18 | 16 | 15 | — |
| Al$_2$O$_3$ | 2 | 5 | 5 | 5 | 5 | 5 | 10 | — |
| BaO | 4 | — | — | — | — | — | — | — |
| CeO$_2$ | — | — | — | — | 1 | — | — | — |
| Cs$_2$O | — | — | — | — | — | 10 | — | — |
| PbO | — | — | — | — | — | — | — | 30 |
| Cl | 1 | 1 | 1 | 5 | 1 | 4 | 1 | 3 |
| F | 1 | 2 | 2 | 2 | 2 | — | 2 | — |

|  | 17 | 18 | 19 |
|---|---|---|---|
| SiO$_2$ | 55 | 57 | 72.8 |
| Na$_2$O | — | 4 | 10.6 |
| K$_2$O | 12 | 8 | 4.4 |
| Al$_2$O$_3$ | — | — | 2.1 |
| ZnO | — | 1 | 10.0 |
| PbO | 30 | 30 | — |
| Cl | 2 | 3 | 0.2 |
| F | 1 | — | — |

(Mole Percent)

|  | 1 | 2 | 3 | 4 | 5 | 6 | 7 | 8 |
|---|---|---|---|---|---|---|---|---|
| SiO$_2$ | 75.3 | 68.2 | 77.7 | 78.4 | 80.5 | 66.2 | 70.2 | 66.3 |
| Na$_2$O | 17.2 | 4.8 | 4.4 | — | 6.2 | 10.0 | 9.0 | 12.3 |
| K$_2$O | — | 5.8 | 6.6 | 13.2 | 6.1 | — | — | — |
| Li$_2$O | — | — | — | — | — | 4.2 | 9.4 | 4.1 |
| B$_2$O$_3$ | — | — | — | — | — | 13.4 | 8.0 | 11.0 |
| Al$_2$O$_3$ | 1.2 | 1.9 | 1.5 | 1.3 | — | 1.8 | 1.1 | 1.2 |
| ZnO | 5.4 | — | — | 6.2 | 7.1 | — | — | — |
| BaO | 1.0 | — | — | 0.9 | — | 1.6 | 0.7 | 1.6 |
| PbO | — | 19.1 | 9.6 | — | — | — | — | — |
| As$_2$O$_3$ | — | 0.1 | 0.1 | — | — | — | — | — |
| Sb$_2$O$_3$ | — | 0.04 | 0.03 | — | — | — | — | — |
| ZrO$_2$ | — | — | — | — | — | 1.0 | — | — |
| Cl | — | — | — | — | — | 1.8 | 1.6 | 3.5 |

|  | 9 | 10 | 11 | 12 | 13 | 14 | 15 | 16 |
|---|---|---|---|---|---|---|---|---|
| SiO$_2$ | 65.7 | 62.9 | 52.1 | 56.2 | 62.3 | 60.8 | 61.0 | 71.5 |
| Na$_2$O | 11.7 | 10.6 | 14.8 | 14.1 | 10.7 | 10.7 | 11.8 | 13.4 |
| Li$_2$O | 4.1 | — | — | — | — | — | — | — |
| B$_2$O$_3$ | 10.9 | 15.5 | 22.0 | 12.5 | 15.6 | 15.3 | 13.1 | — |
| Al$_2$O$_3$ | 1.2 | 2.9 | 3.0 | 2.8 | 3.0 | 3.3 | 6.0 | — |
| BaO | 1.6 | — | — | — | — | — | — | — |
| CeO$_2$ | — | — | — | — | 0.3 | — | — | — |
| Cs$_2$O | — | — | — | — | — | 2.5 | — | — |
| PbO | — | — | — | — | — | — | — | 9.3 |
| Cl | 1.7 | 1.7 | 1.7 | 8.2 | 1.7 | 7.5 | 1.7 | 5.9 |
| F | 3.2 | 6.3 | 6.4 | 6.1 | 6.4 | — | 6.4 | — |

|  | 17 | 18 | 19 |
|---|---|---|---|
| SiO$_2$ | 71.2 | 71.4 | 77.0 |
| Na$_2$O | — | 4.8 | 10.8 |
| K$_2$O | 9.9 | 6.4 | 3.0 |
| Al$_2$O$_3$ | — | — | 1.3 |
| ZnO | — | 0.9 | 7.8 |
| PbO | 10.4 | 10.1 | — |
| Cl | 4.4 | 6.4 | 0.3 |
| F | 4.1 | — | — |

Table II reports the simultaneous hydration and Ag+ ion exchange taking place in several of the exemplary compositions listed in Table I. In the reported examples a solution containing five grams of silver sulfate (Ag$_2$SO$_4$) in 100 ml. H$_2$O was acidified with 0.5 ml. of concentrated sulfuric acid (H$_2$SO$_4$). Glasses of different compositions in the form of 0.015" thick ribbon were immersed into the solution, the containers holding the samples and solutions sealed in an autoclave, and heated at 270° C. for eight hours. (A steam pressure of about 785 psig. was developed within the autoclave.) Thereafter, the samples were removed from the autoclave, washed with distilled water, and the resulting clear glass inspected visually. The water content in the glass structure was also measured. Table II records those findings.

TABLE II

| Example No. | Weight % H$_2$O in Sample | Visual Appearance |
|---|---|---|
| 1 | 7.3 | Some light and dark yellow areas |
| 2 | 1.3* | Dark amber |
| 4 | 6.0 | Very dark amber |
| 5 | 5.6 | Very dark amber - irridescent surface |

*Not completely hydrated

Table III illustrates the concurrent hydration and Ag+ ion exchange involving the use of aqueous silver nitrate (AgNO$_3$) solutions, both with added acid and without. A visual description is provided of the product resulting from immersing the 0.015" thick ribbon into AgNO$_3$ solutions, wherein the silver salt concentration was varied from 0.25 g/100 ml. H$_2$O up to 10 g/100 ml. H$_2$O, and then heated in an autoclave at 270° C. for eight hours. The solutions were acidified with nitric acid (HNO$_3$) having a concentration of 1 ml. HNO$_3$/100 ml. H$_2$O.

TABLE III

| Example No. | Concentration of AgNO$_3$ | Appearance Without Acid | Appearance With Acid |
|---|---|---|---|
| 3 | 0.25 g | Amber | Clear |
| 3 | 1.0 g | Darker amber | Slight coloration in parts |
| 3 | 2.5 g | Still darker amber | Streaks of amber coloration |
| 3 | 10 g | Even darker amber | More amber coloration |
| 5 | 0.25 g | Very dark amber | Bright yellow |
| 5 | 1.0 g | Darker amber | Dark yellow |
| 5 | 2.5 g | Still darker amber | Amber |
| 5 | 10 g | Surface flaked off | Very dark amber |

Table III clearly illustrates the effect of utilizing greater silver ion concentrations since the exchange reaction proceeds to a greater extent with such. The presence of an oxidizing agent can reduce the yellow coloration produced by the reduced silver.

Examples 6–15 of Table I contained chloride and, although not cited specifically in Table I, Examples 10–18 contained about 0.01 mole percent CuO as a sensitizing agent. Two groups of 0.015" thick ribbon samples were studied. The first group (10–13) was exposed to temperatures in the vicinity of the glass annealing point for about 16 hours, whereas the second group was given no such preliminary heat treatment. Both groups of samples were immersed into aqueous AgNO$_3$ solutions having a AgNO$_3$ concentration of 1g/100 ml. H$_2$O, which were acidified with a boric acid solution of 5g H$_3$BO$_3$/100 ml. H$_2$O. The samples were hydrated in an autoclave for 16 hours at 250° C.

Upon removal from the autoclave, cooling to room temperature, and washing with distilled H$_2$O, the ribbon samples displayed photosensitivity to ultraviolet radiation, the time required to darken the sample and the color developed depending upon the glass composition. Infrared spectrographic analyses of the glass samples established the presence of both water and OH⁻ groups in the glass structure.

The samples subjected to the preliminary heat treatment exhibited less hydration and less silver ion exchange. Moreover, those samples displayed less photosensitivity. As illustrative of this latter phenomenon, Example No. 11 darkened in an ambient indoors environment at room temperature without exposure to a specific source of ultraviolet radiation when the ribbon had not been subjected to a preliminary heat treatment. In contrast, the ribbon receiving the preliminary heat treatment manifested photosensitive behavior only when exposed to an intense source of ultraviolet radiation. The photosensitivity displayed by the several exemplary compositions was lost when the hydrated samples were heated for about 16 hours at 130° C.

Examples 16–18 in ribbon form were immersed into aqueous $AgNO_3$ solutions consisting of 0.5 g $AgNO_3$/100 ml. $H_2O$, which were acidified with a nitric acid solution of 1 ml. $HNO_3$/100 ml. $H_2O$. The samples were hydrated in an autoclave for 16 hours at 240° C. (A steam pressure of about 475 psig. was developed within the autoclave.)

After removal from the autoclave, cooling to room temperature, and washing with distilled water, the samples displayed photosensitive characteristics when exposed to a high intensity source of ultraviolet radiation. The rate of darkening under ultraviolet radiation ranged in the approximate order of $F^- + Cl^- > Cl^- > F^-$, with the maximum rate seemingly involving about 3% by weight of total halide. Heat treating of these non-$B_2O_3$ compositions at about their annealing points prior to the hydration process appeared to have no noticeable effect upon extent of hydration, the silver ion exchange, or the photosensitivity of the samples.

Continued hydration, i.e., about 16 hours, of each of the exemplary compositions of Table I in a steam atmosphere yielded a shiny, non-conductive metallic surface, thereby indicating reduction of the silver ions to metallic silver. However, rehydration of the silver-containing hydrated glass in dilute aqueous $HNO_3$ solution, viz., 1 ml. $HNO_3$/100 ml. $H_2O$, resulted in clear glasses with increased water content.

Ribbon samples of Example 16 were immersed into an aqueous $AgNO_3$ solution consisting of 0.5 g $AgNO_3$/100 ml. $H_2O$, which was acidified with a nitric acid solution of 1 ml. $HNO_3$/100 ml. $H_2O$. The samples were hydrated in an autoclave at 240° C. for 16 hours.

After removal from the autoclave, cooling to room temperature, and washing with distilled $H_2O$, the samples were irradiated with intense ultraviolet light, and then optically bleached using both polarized and non-polarized laser beams. Where the non-polarized beam was employed, the ultraviolet darkened glass bleached to give an area of the same color as the irradiating laser. For example, where a red beam was used, an area was produced in the glass having a reddish hue. In contrast, where a polarized laser beam is impinged upon the ultraviolet darkened glass, an area is bleached which is capable of polarizing visible light. Measurement of the light transmitted by the bleached area exhibited a dichroic ratio of 3:1. The dichroic effect appears to be permanent in the ambient environment.

These darkening, bleaching, and polarizing properties are of special interest with base glass compositions consisting essentially, in mole percent on the oxide basis, of 70–82% $SiO_2$, 10–17% $Na_2O$ and/or $K_2O$, 0.5–5% $Al_2O_3$, and 5–15% $ZnO$ and/or $PbO$, which are hydrated and dehydrated in a gaseous steam containing atmosphere in accordance with U.S. Pat. No. 3,912,481, supra. About 0.1–1 mole percent of a halide and about 0.001–0.1 mole percent of a sensitizing agent such as $CuO$ and/or $CeO_2$ will be included in the glass composition. Silver ion exchange utilizing an aqueous silver salt solution will be carried out in the hydration-dehydration procedure. To insure glass clarity and freedom from color, the oxidation state of the glass is controlled in both the batch composition and in the aqueous solutions providing the source for the silver ion exchange reaction. This control of the oxidation state of the glass can be obtained by including an oxidizing agent, e.g., $NO_3^-$, $H_2O_2$, or $ClO_4^-$, in said glass composition and/or in said aqueous solution.

Through variations in amounts and identities of the halides included in the glass compositions and/or variations in the components of the aqueous silver ion exchange solutions, it is possible to obtain a wide spectrum of colors in the hydrated-ion exchanged products which have the same base composition. Also, transparent or opaque final products can be achieved by varying the aqueous silver ion exchange solutions.

The preferred ion exchange solution will have a silver ion concentration of about 0.1–1% by weight, a pH range of about 3–5, and will contain an oxidizing agent, e.g., $NO_3^-$, $H_2O_2$, or $ClO_4^-$. Although both silver ions and an oxidizing agent are mandatory, they need not both be contained in the same solution. Hence, as is illustrated in the example immediately below, it can be advantageous to alter the oxidation state of the glass in a separate treatment.

Example 19 of Table I, in the form of 0.015" thick glass ribbon, was hydrated within an autoclave operating at 300° C. for 2 hours in a saturated steam atmosphere. (A steam pressure of about 1230 psig. was developed within the autoclave.) The glass was subsequently dehydrated at 300° C. in an atmosphere of 1400 psig. total pressure, consisting of 400 psig. steam and 1000 psig. nitrogen. After cooling to room temperature, the water content of the glass body was determined to be about 6% by weight.

The hydrated ribbon samples were then immersed into a buffered aqueous solution composed of 6 ml. acetic acid, 0.82 g. sodium acetate, and 0.5 g. silver acetate per 100 ml. $H_2O$ for three hours at a temperature of 200° C. The samples were removed from the solution, washed in distilled water, and thereafter immersed into an aqueous 1% by weight solution of $HNO_3$ for four hours at 200° C. A transparent, essentially colorfree, glass body was produced.

The hydrated glass exhibits substantial photosensitivity, i.e., it will darken to a very dark brown when exposed to ultraviolet radiation such as is provided after a five minute exposure to a 1000 watt Hg short arc. No preliminary heat treatment is required to induce photosensitivity. The darkened images are stable in sunlight but can be bleached and/or polarized with high intensity red light, e.g., 100 m watt/$cm^2$, which is readily available from a He—Ne laser. The original darkened images, the bleached images, and the polarized images appear to be permanent in nature in the ambient environment. There is seemingly a threshold for the electric field intensity of light to bleach or polarize the original darkened image. An explanation postulated therefor states that when the intensity of the red light is sufficiently high, diffusion of silver ions in the surface of the silver halide crystals and the ejection of electrons occur.

To achieve high contrast of the dichroic image, the exposure to ultraviolet radiation of the hydrated glass will be continued until the maximum extent of darkening is obtained. However, the contrast of the dichroic image does not seem to be significantly affected through further darkening by impingement of ultraviolet radiation.

In summary, the invention provides glasses exhibiting thermoplastic behavior, thus permitting the shaping of articles at low temperatures by means of such conventional forming techniques as pressing, molding, and extrusion, while optionally producing glasses demonstrating photosensitivity.

We claim:

1. A method for making a transparent, essentially colorless glass body exhibiting thermoplastic properties wherein at least a surface portion thereof contains $Ag^+$ ions which comprises melting a batch for an anhydrous glass body consisting essentially, in mole percent on the oxide bases, of about 3–25% $Na_2O$ and/or $K_2O$, 50–95% $SiO_2$, up to 25% of at least one oxide selected from the group of BaO, $B_2O_3$, CaO, PbO, and ZnO, up to 35% MgO, up to 20% $Al_2O_3$, and up to 10% $Li_2O$, and then contacting said anhydrous glass body in thickness dimensions no greater than about 5 mm. with an aqueous solution environment containing $Ag^+$ ions having a pH less than about 4, the oxidation state of the glass being controlled in both the batch composition and in said aqueous solution environment, said oxidation state of said aqueous solution environment being controlled by including an oxidizing agent therein, this contact being made at a temperature in excess of 100° C. and at a pressure in excess of 20 psig for a period of time sufficient to hydrate at least a surface portion on said glass body having an amount of $H_2O$ absorbed therein effective to impart thermoplastic properties thereto and to cause the replacement of $Na^+$ and/or $K^+$ ions with $Ag^+$ ions in said hydrated glass, the proportion of $Na^+$ and/or $K^+$ ions in said hydrated glass being less with a corresponding increase in $Ag^+$ ions.

2. A method according to claim 1 wherein said temperature ranges up to 374° C.

3. A method according to claim 1 wherein said $Ag^+$ ion concentration ranges between about 0.1–10% by weight.

4. A method according to claim 1 wherein said oxidizing agent is selected from the group consisting of $NO_3^-$, $H_2O_2$, and $ClO_4^-$.

5. A method according to claim 1 wherein subsequent to the said hydration process, said glass body is contacted with an aqueous solution having a pH less than about 4 and containing an oxidizing agent.

6. A method according to claim 5 wherein said oxidizing agent is selected from the group consisting of $NO_3^-$, $H_2O_2$, and $ClO_4^-$.

7. A method for making a transparent, essentially colorless glass body wherein at least a surface portion thereof exhibits thermoplastic properties and wherein at least said surface portion thereof contains $Ag^+$ ions which comprises the steps of:

(a) melting a batch for an anhydrous glass body consisting essentially, in mole percent on the oxide basis, of about 3–25% $Na_2O$ and/or $K_2O$, 50–95% $SiO_2$, up to 25% of at least one oxide selected from the group of BaO, $B_2O_3$, CaO, PbO, and ZnO, up to 35% MgO, up to 20% $Al_2O_3$, and up to 10% $Li_2O$;

(b) hydrating said anhydrous glass body by exposing said body to a $H_2O$-containing gaseous atmosphere having a relative humidity of at least about 75% at a temperature of at least about 100° C. for a period of time sufficient to develop at least a surface portion which is essentially saturated with $H_2O$;

(c) dehydrating said body through contact thereof with a gaseous environment wherein the relative humidity is less than about 90% of that employed in said hydration step for a period of time sufficient to reduce the water content at least within said surface portion but leaving an amount therein effective to impart thermoplastic properties thereto; and then (d) contacting said hydrated glass body with an aqueous solution environment containing $Ag^+$ ions having a pH less than about 5, this contact being made at a temperature in excess of 100° C. for a period of time sufficient to cause the replacement of $Na^+$ and/or $K^+$ ions in said hydrated glass with $Ag^+$ ions, the proportion of $Na^+$ and/or $K^+$ ions in said hydrated glass being less with a corresponding increase in $Ag^+$ ions, the oxidation state of the glass being controlled in both the batch composition and in said aqueous solution environment, said oxidation state of said aqueous solution being controlled by including an oxidizing agent thereof.

8. A method according to claim 7 wherein said hydration temperature ranges up to 374° C.

9. A method according to claim 7 wherein said contact with an aqueous solution is made at temperatures up to 374° C.

10. A method according to claim 7 wherein the concentration of $Ag^+$ ions in said aqueous solution ranges between about 0.1–10%.

11. A method according to claim 7 wherein said oxidizing agent is selected from the group consisting of $NO_3^-$, $H_2O_2$, or $ClO_4^-$.

12. A method according to claim 7 wherein said silver-containing, hydrated glass body is contacted with an aqueous solution having a pH less than about 4 and containing an oxidizing agent subsequent to the process wherein $Ag^+$ ions replace $Na^+$ and/or $K^+$ ions.

13. A method for making a transparent, essentially colorless glass body exhibiting thermoplastic properties and photosensitivity to ultraviolet radiation, and wherein at least a surface portion thereof contains $Ag^+$ ions, which comprises melting a batch for an anhydrous glass body consisting essentially, in mole percent on the oxide basis, of about 3–25% $Na_2O$ and/or $K_2O$, 50–95% $SiO_2$, up to 25% of at least one oxide selected from the group of BaO, $B_2O_3$, CaO, PbO, and ZnO, up to 35% MgO, up to 20% $Al_2O_3$, up to 10% $Li_2O$, and about 0.1–3% of a halide selected from the group $F^-$, $Cl^-$, $Br^-$, and $I^-$, and then contacting said anhydrous glass body in thickness dimensions no greater than about 5 mm. with an aqueous solution environment containing $Ag^+$ ions having a pH less than about 4, the oxidation state of the glass being controlled in both the batch composition and in said aqueous solution environment, said oxidation state of said aqueous solution environment being controlled by including an oxidizing agent therein, this contact being made at a temperature in excess of 100° C. and at a pressure in excess of 20 psig for a period of time sufficient to hydrate at least a surface portion on said glass body having an amount of $H_2O$ absorbed therein effective to impart thermoplastic properties thereto and to cause the replacement of $Na^+$ and/or $K^+$ ions with $Ag^+$ ions in said hydrated glass, the proportion of $Na^+$ and/or $K^+$ ions in said hydrated glass being less with a corresponding increase in $Ag^+$ ions.

14. A method according to claim 13 wherein said anhydrous glass also contains about 0.001–0.1 mole percent of a sensitizing agent.

15. A method according to claim 14 wherein said sensitizing agent is selected from the group CuO and $CeO_2$.

16. A method according to claim 13 wherein said anhydrous glass consists essentially, in mole percent on the oxide basis, of about 70–82% $SiO_2$, 10–17% $Na_2O$ and/or $K_2O$, 5–15% ZnO and/or PbO, 0.5–5% $Al_2O_3$, and 0.5–3% of a halide selected from the group $F^-$, $Cl^-$, $Br^-$, and $I^-$.

17. A method according to claim 16 wherein said anhydrous glass also contains about 0.001–0.1 mole percent CuO and/or $CeO_2$.

18. A method for making a transparent, essentially colorless glass body exhibiting thermoplastic properties and photosensitivity to ultraviolet radiation, and wherein at least a surface portion thereof contains $Ag^+$ ions, which comprises the steps of:

(a) hydrating a glass body consisting essentially, in mole percent on the oxide basis, of about 3–25% $Na_2O$ and/or $K_2O$, 50–95% $SiO_2$, up to 25% of at least one oxide selected from the group of BaO, $B_2O_3$, CaO, PbO, and ZnO, up to 35% MgO, up to 20% $Al_2O_3$, up to 10% $Li_2O$, and about 0.1–3% of a halide selected from the group $F^-$, $Cl^-$, $Br^-$, and $I^-$, by exposing said body to a $H_2O$-containing gaseous atmosphere having a relative humidity of at least about 75% at a temperature of at least about 100° C. for a period of time sufficient to develop at least a surface portion which is essentially saturated with water;

(b) dehydrating said body through contact thereof with a gaseous environment wherein the relative humidity is less than about 90% of that employed in said hydration step for a period of time sufficient to reduce the water content at least within said surface portion but leaving an amount therein effective to impart thermoplastic properties thereto; and (c) contacting said hydrated glass body with an aqueous solution containing $Ag^+$ ions having a pH less than about 5, this contact being made at a temperature in excess of about 100° C. for a period of time sufficient to cause the replacement of $Na^+$ and/or $K^+$ ions in said hydrated glass with $Ag^+$ ions, the proportion of $Na^+$ and/or $K^+$ ions in said hydrated glass being less with a corresponding increase in $Ag^+$ ions, the oxidation state of the glass being controlled in both the batch composition and in said aqueous solution, the oxidation state of said aqueous solution being controlled by including an oxidizing agent therein.

19. A method according to claim 18 wherein said anhydrous glass also contains about 0.001–0.1 mole percent of a sensitizing agent.

20. A method according to claim 19 wherein said sensitizing agent is selected from the group CuO and $CeO_2$.

21. A method according to claim 18 wherein said anhydrous glass consists essentially, in mole percent on the oxide basis, of about 70–82% $SiO_2$, 10–17% $Na_2O$ and/or $K_2O$, 5–15% ZnO and/or PbO, 0.5–5% $Al_2O_3$, and 0.5–3% of a halide selected from the group $F^-$, $Cl^-$, $Br^-$, and $I^-$.

22. A method according to claim 21 wherein said anhydrous glass also contains about 0.001–0.1 mole percent CuO and/or $CeO_2$.

* * * * *